F. R. FORD.
Ore Amalgamator.
No. 14,357
Patented Mar. 4, 1856.
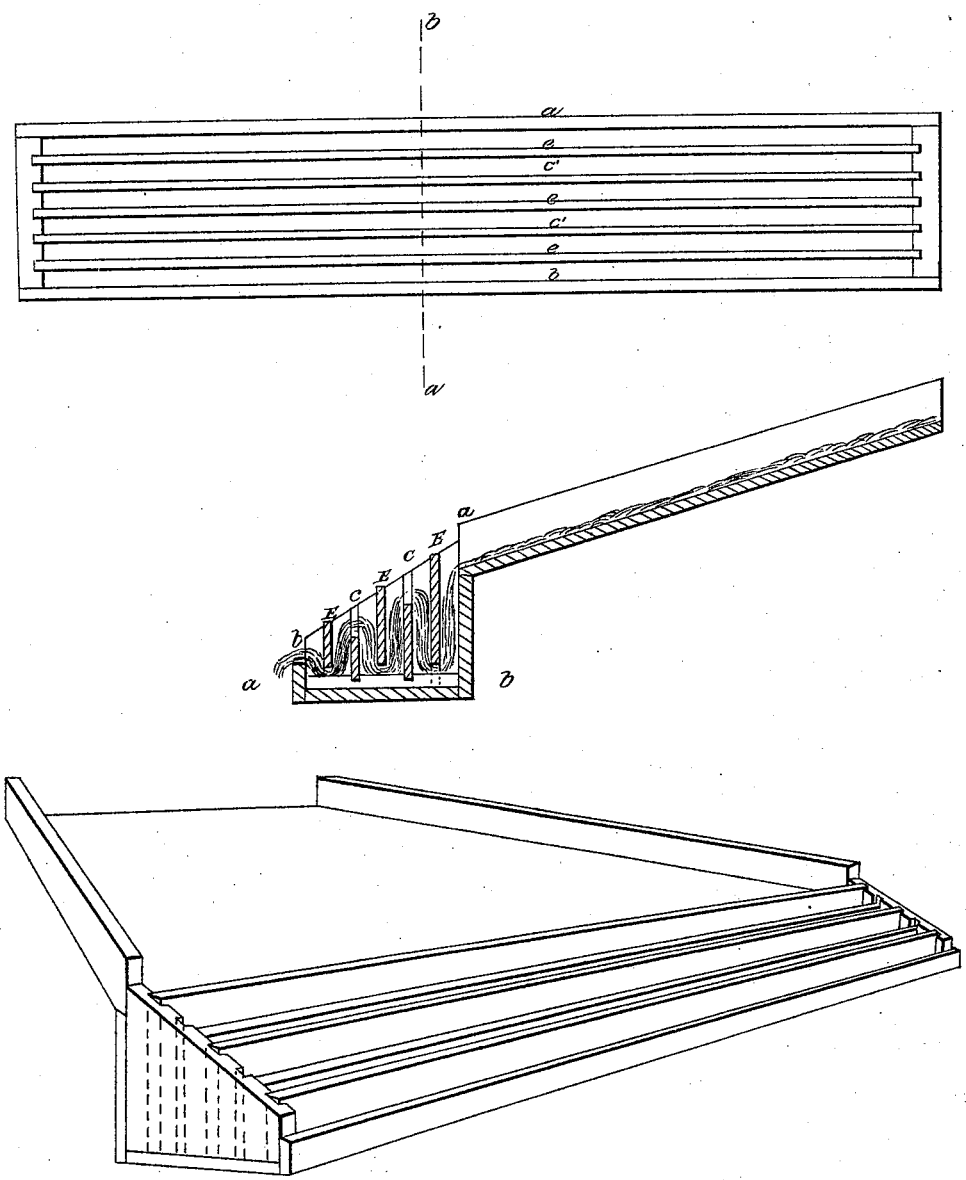
Witnesses:
Inventor:

UNITED STATES PATENT OFFICE.

F. R. FORD, OF OPHIR, CALIFORNIA.

RIFFLE-BOX.

Specification of Letters Patent No. 14,357, dated March 4, 1856.

To all whom it may concern:

Be it known that I, F. R. FORD, of Ophir, county of Butte, and State of California, have invented a new and Improved Mode of Constructing Riffle-Boxes for the Purpose of Saving Fine Gold; and I do hereby declare that the following is a full and exact description of the said invention.

The nature of my invention consists in the construction of a riffle box, to contain quicksilver, with divisions, and at the same time holding all the quicksilver used in one body or mass and causing it to be in constant motion; by forcing earth and quartz, in which there is fine gold into contact with the quicksilver while washing: thus assisting the fine gold and quicksilver to amalgamate. The quicksilver being connected under the riffles, is less liable to be broken into little globules, and carried away by a sudden rush of water. With this machine, I require but from four to nine inches drop or fall, according to its size, and amount of water used in washing: I thus save the miner the necessity, as at present, of digging long "tail races," and using many long sluice boxes.

The cost of my riffle box is trifling, and I can carry it under my arm, or pack it on mules to any part of the mountains, and commence working with it without any delay or loss of time.

To enable others skilled in mining, to make and use my invention, I will proceed to describe its construction, and operation.

I construct a box three feet in length, and seven inches in width, (see ground plan), and five inches high at $a$ (as shown in the drawing accompanying this specification) where the water is introduced, and one and one-half inches at $b$, where the water is discharged, as shown in section $a$, $b$, the ends sloping to correspond with the two sides, (see perspective view) at an angle of about thirty degrees, from back to front. This box I divide into three equal parts with the riffles, C—which move up and down at pleasure in the grooves at the end, (as seen in the perspective view, and ground plan.) In the center of each of these divisions I place a dashboard E also held in groove at the end, to force the water and earth or quartz in which there is fine gold underneath the dashboard, E and over the riffle C. I level the box in its place and cover the bottom with quicksilver to the depth of about half of one inch. I push the riffle, C down into the quicksilver, but not to the bottom, thus leaving the quicksilver in one mass. The dashboard E I place within half of one inch of the quicksilver. This arrangement forces the water and earth while washing, into contact with the quicksilver, and by its weight and current in passing through the machine, causing an oscillating motion in the quicksilver. I thus accomplish what miners have long sought to attain, without washing or losing quicksilver.

Before introducing the earth to be washed into the machine, I have it pass over a grating or sieve, to separate the stone and other large substances from it: the grating I do not claim as my invention, nor the spreading apron from which water falls into the machine. There is no similarity to my knowledge, between my invention, and any other ever used before save in one respect, viz: A pan or box with quicksilver in the bottom has been used at the end of the old fashioned "Tom" and so set that water and earth will plunge into the quicksilver passing under a partition and be discharged on the opposite side. This can only be used with a small head of water and the fall has always been so great as to break the quicksilver into little globules and carry it off with the water. Never have I known of one being used without more fall than two of my entire machines require.

I have described the dimensions of a machine to be used with an ordinary "Tom" head of water. Other sizes will be needed varying with the amount of water used.

Where the weather is uniformly mild I will construct my machine of wood but in the colder regions of iron so that fire can be applied to keep the quicksilver at a proper temperature to amalgamate with the gold.

What I claim as new in my invention and desire to secure by Letters Patent is—

The arrangement of the riffles E and C in respect to the surface of the quicksilver as herein described.

F. R. FORD.

Witnesses:
   J. C. POTTER,
   ROBERT MILLS.